United States Patent [19]

VanSchaick et al.

[11] Patent Number: 4,910,421

[45] Date of Patent: Mar. 20, 1990

[54] POTENTIAL SOURCE EXCITATION SYSTEM WITH VOLTAGE AND CURRENT ADJUSTMENT

[75] Inventors: Thomas E. VanSchaick, Burnt Hills; George M. Cotzas, Schenectady, both of N.Y.

[73] Assignee: General Electric Company, Schenectady, N.Y.

[21] Appl. No.: 267,587

[22] Filed: Nov. 7, 1988

[51] Int. Cl.$^4$ .................. H02K 3/00; H02P 11/06; H02P 9/14

[52] U.S. Cl. ............................. 310/68 D; 310/199; 322/59

[58] Field of Search ............... 310/198, 68 D; 322/59, 322/62

[56] References Cited

U.S. PATENT DOCUMENTS

| | | | |
|---|---|---|---|
| 3,702,964 | 11/1972 | Kudlacik et al. | 322/59 |
| 4,015,189 | 3/1977 | Gorden | 310/181 |
| 4,032,835 | 6/1977 | Finnel et al. | 322/59 |
| 4,268,788 | 5/1981 | Takeda et al. | 322/59 |
| 4,477,767 | 10/1984 | Cotzas | 322/59 |
| 4,682,068 | 7/1987 | Cotzas et al. | 322/59 |

Primary Examiner—Patrick R. Salce
Assistant Examiner—D. L. Rebsch
Attorney, Agent, or Firm—Jerome C. Squillaro

[57] ABSTRACT

A P-bar excitation system employs a generator having means for adjusting the voltage and current available from the P-bars. In some installations, the direct output of the P-bars can be connected directly to the rectifier and control circuit for development of dc excitation power. This permits elimination of the conventional excitation transformer and overall simplification of the excitation system. The voltage and current are adjusted using paired P-bars per phase, wherein each pair of P-bars is connected in series, and angularly displaced from each other about the inner circumference of the armature to attain a vector sum of voltages yielding and desired voltage per phase. In another embodiment, the generator magnetic flux, or equivalently, the number of armature turns is adjusted to yield the desired P-bar voltage and current.

7 Claims, 6 Drawing Sheets

POTENTIAL SOURCE EXCITATION SYSTEM WITH VOLTAGE AND CURRENT ADJUSTMENT

BACKGROUND OF THE INVENTION

The present invention relates to dynamoelectric machines and, more particularly, to dynamoelectric machines having a field rotor excited by a dc power source.

A large generator, for example, employs a rotor magnetically excited by a dc power source to produce a magnetic field which is rotated within a stationary armature. The armature includes windings which produce AC electric power as the magnetic field of the rotor rotates past them.

The rotor requires a substantial source of dc exciter power to produce a magnetic field of magnitude sufficient to drive the generator to full output under rated load. Four techniques are conventionally employed to provide the dc exciter power.

In a first technique, AC power from an external source is passed through a transformer to adjust its voltage to a value compatible with later functions. In most cases, the transformer reduces the ac voltage. A rectifier and control assembly produces dc exciter power for connection to the field rotor through slip rings. In some cases, the external source of ac power may be the output power of the generator itself.

In a second technique, a dc generator is connected to the generator shaft to produce the required dc power. This dc power is connected to the field rotor through slip rings. This technique has the disadvantage that the length of the overall generator is increased. As a consequence, the building to house the generator must be made correspondingly larger. This, and the need for the dc generator, adds substantially to the cost of the plant.

In a third technique, a stationary DC source excites ac exciter windings rotating with the rotor. A rectifier assembly in the rotor produces the required dc exciter power. This technique suffers from the weight and complexity of the rectifier assembly. In addition, the high-acceleration environment in the rotor is believed to encourage low reliability.

In a fourth technique, disclosed in U.S. Pat. No. 4,477,767, the disclosure of which is incorporated herein by reference, three slots in the armature, mutually spaced apart at 120 degrees, receive exciter or P-bars (potential bars). As the magnetic field rotates to generate output power in the normal armature windings, it also generates ac exciter power in the P-bars. This exciter power is passed through a transformer to adjust its voltage before being connected to a rectifier and control assembly for the production of dc exciter power. The resulting dc exciter power is connected through slip rings to the field rotor.

This fourth technique, sold under the trademark "Generrex PPS" by the GE corporation, has found wide acceptance in the field. However, the need for a transformer adds an increment of cost which it would be desirable to avoid, if possible.

As noted above, the transformer adjusts the output voltage of the P-bars to a value consistent with the needs of the field winding. At the same time, the current is adjusted to a value which is compatible with the requirements of the field rotor and with the capacities of commercially available rectifier devices. It has been believed heretofore that the voltages and currents that can be generated by P-bars must be adjusted in a transformer before rectification.

The isolation provided by the delta-wye connection of the transformer and the series inductances contributed by the transformer in the '767 patent conventionally are believed necessary to avoid damage in response to faults in the excitation potential winding field winding in the rotor or other sources.

OBJECTS AND SUMMARY OF THE INVENTION

It is an object of the invention to provide an exciter power source which overcomes the drawbacks of the prior art.

It is a further object of the invention to provide a P-bar exciter power source including means for establishing the AC output of the P-bars at a value compatible with downstream elements in the exciter and field rotor.

It is a still further object of the invention to provide a P-bar exciter source which permits omission of an exciter transformer. It is a still further object of the invention to provide a P-bar exciter system in which outputs of pairs of P-bars per phase are added vectorially to adjust the output voltage and current of the P-bars. The two P-bars in a phase are positioned at spaced angular positions about the armature, whereby the output voltage is either reduced or increased as desired.

It is a still further object of the invention to provide a P-bar exciter system in which voltage outputs of the P-bars are adjusted by adjusting the number of series turns in the armature.

Briefly stated, the present invention provides a P-bar excitation system wherein a generator includes means for adjusting the voltage and current available from the P-bars. In many installations, the direct output of the P-bars can be connected directly to the rectifier and control circuit for development of DC excitation power. This permits elimination of the conventional excitation transformer. The voltage and current are adjusted using paired P-bars per phase, wherein each pair of P-bars is connected in series, angularly displaced from each other about the inner circumference of the armature to attain a vector sum of voltages yielding the desired voltage per phase. In another embodiment, the number of armature turns is adjusted to yield the desired P-bar voltage and current.

According to an embodiment of the invention, there is provided a generator and excitation system comprising: a generator, an armature in said generator, a field rotor in said generator, said field rotor being rotatable within said armature, a plurality of slots in said armature for containing armature windings, a plurality of said slots containing P-bars, means for connecting an electrical power output of said P-bars to said field rotor for excitation thereof, said means for connecting including mean for converting an ac excitation electric power to a dc excitation electric power, whereby said field rotor is magnetized, means for adjusting a value of at least a voltage of said ac excitation electric power connected to said means for converting, and said means for adjusting being at least partly contained in said armature.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
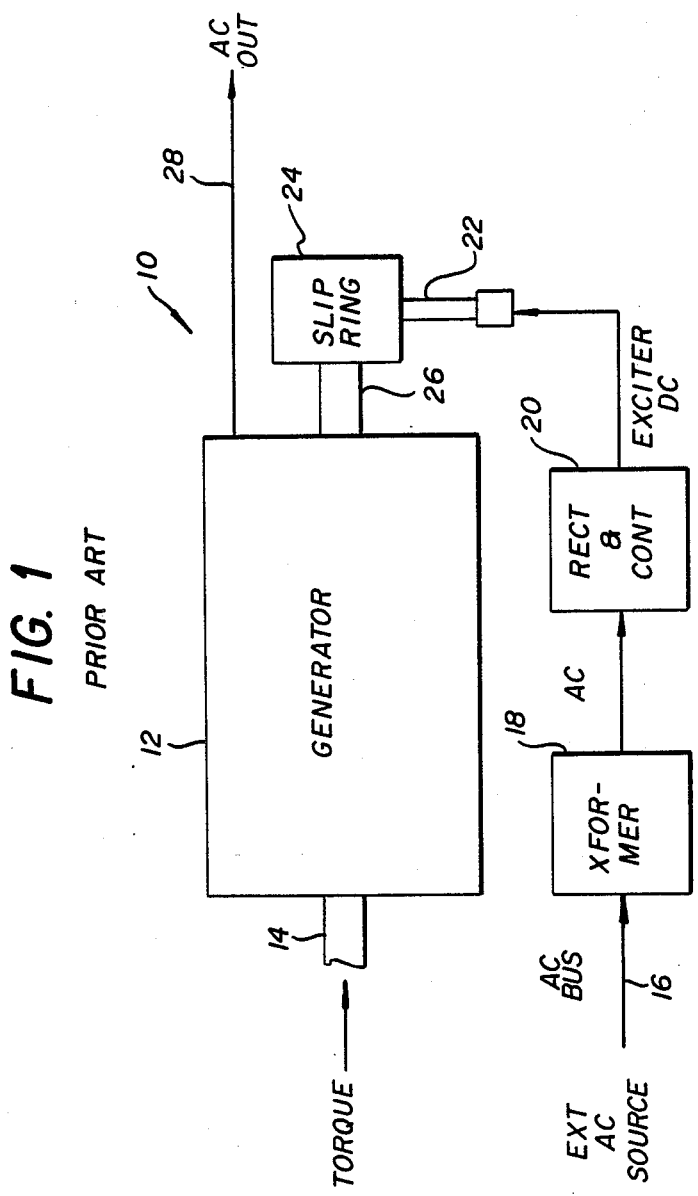
FIG. 1 is a block diagram of a generator and bus-type exciter according to the prior art.

Referring to FIG. 1, there is shown, generally at 10, a generator and exciter system according to the prior art. A generator 12 receives torque from an external source (not shown) on a shaft 14 to rotate a field rotor (not shown) within a cylindrical armature (also not shown). Generator 12 is assumed to be fully conventional and further details of its interior are properly omitted herefrom.

An ac bus 16 provides raw exciter ac power to an exciter transformer 18. After voltage adjustment in exciter transformer 18, usually involving voltage reduction, the ac power is connected to inputs of a rectifier and control assembly 20. Rectifier and control assembly 20 further adjusts the average power in the ac waveform using, for example, thyristor-type devices, and rectifies the result. The dc output of rectifier and control assembly 20 is applied through brushes 22 to a slip-ring 24 mounted to rotate with a shaft 26. The power output of generator 12 is connected on a power bus to an external load.

The apparatus in FIG. 1 relies on an external source of ac power or excitation of its field rotor. If such an external source should become unavailable for any reason, excitation must fail during such unavailability. Also, additional cost is entailed in providing the tie from the external source to exciter transformer 18.

Figure 2:
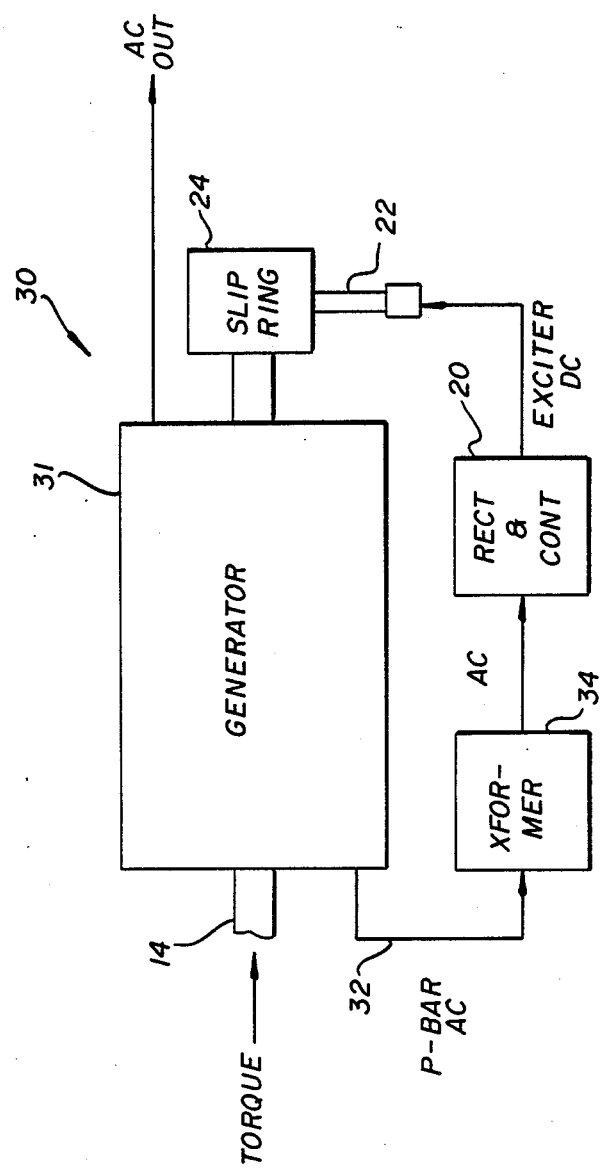
FIG. 2 is a block diagram of a generator and a P-bar exciter according to the above-referenced patent.

Referring now to FIG. 2, there is shown, generally at 30, a generator and exciter system according to the referenced '767 patent. As described therein, the '767 patent employs generator 31 having a set of three conductors (not shown), called P-bars, disposed in slots in the stator. The P-bars are spaced angularly apart 120 degrees on the inner circumference of he armature. One end of each P-bar is connected to an end of the other P-bars and to ground. The ungrounded ends of the P-bars feed three-phase excitation power through an AC excitation bus 32 to an excitation transformer 34 which adjusts the voltage and provides dc isolation series inductance in the manner disclosed in the referenced patent. The ac output of excitation transformer 34 is controlled and rectified in rectifier and control assembly 20 in a manner identical to the system prior-art system shown in FIG. 1. As in the prior embodiment, the resultant dc excitation power is fed through brush 22 and slip-ring 24 to the field rotor (not shown) in generator 31.

Excitation transformer 34 has always been used in P-bare excitation systems because those skilled in the art believed that it was needed to adjust the voltage and current available from the P-bars within generator 31 because protection systems using available and proven components were available, and to provide the isolation and series inductance corresponding to that conventionally provided in the prior-art system of FIG. 1. We have discovered that it is possible to adjust the voltage and current produced by the P-bars. The voltage can be adjusted either upward or downward in the manner to be described hereinafter. Accordingly, transformer design may be simplified.

We have further discovered that, in some applications, the adjustment of voltage produced by the P-bars may even provide ac voltage and current at values allowing direct connection of the ac exciter power to a rectifier and control assembly, thereby permitting elimination of the transformer altogether. In such applications, the isolation and series inductance conventionally provided by the excitation transformer may be either unnecessary, or may be obtained in simpler and lower-cost ways. The series inductance of the modified system is inherently increased by the fact that two bars are used in series, rather than one, as in the prior art. In addition, it is expected that modern design of fault detection and protection circuits will enable the omission of the dc isolation provided by a transformer without significant increase in risk in the event of a fault. In applications where series inductance is required, we have discovered that small inductances such as that provided by iron or air core reactors can be employed in series with the three legs of ac excitation bus 32 at much lower cost than is incurred in providing a transformer.

Figure 3:
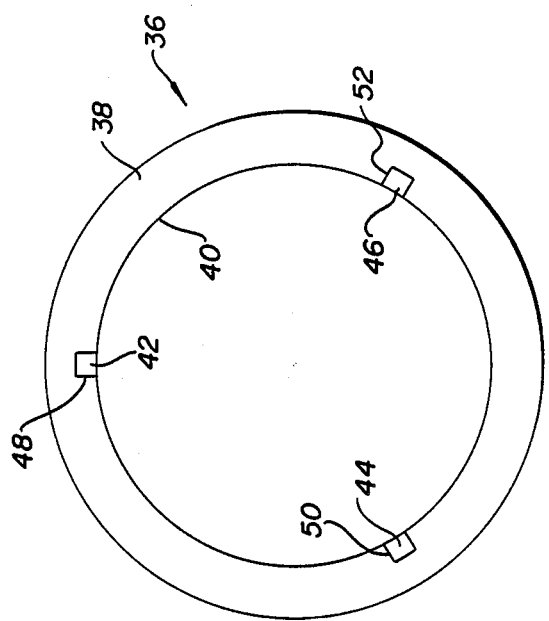
FIG. 3 is a cross section of an armature of the generator of FIG. 2.

As background for the remainder of the present disclosure, we refer now to FIG. 3, wherein an armature 36 of a generator 12 is shown with unnecessary detail omitted. Armature 36 includes a hollow cylindrical structure 38 formed of a stack of sectorally shaped laminations (not shown separately). An inner surface 40 of hollow cylindrical structure 38 includes a large number of longitudinal armature slots (omitted from the drawing to avoid clutter) containing conductor bars which are connected together by end turns to form the necessary generator windings. As disclosed in the referenced patent, three P-bars 42, 44 and 46 are disposed in three selected armature slots 48, 50 and 52, respectively. It has been found to be practical to install the P-bars atop the armature conductor bars (not shown) already installed in the armature slots. Techniques for affixing P-bars in the spaced-apart positions shown are well known and such techniques are fully disclosed in papers and prior patents, and further description thereof is not required. One skilled in the art will recognize that the three armature slots shown are merely a selected set of a much larger number of armature slots closely spaced about inner surface 40. The remaining armature slots are not of concern to the present disclosure and are thus omitted from the drawing for clarity of presentation.

Figure 4:
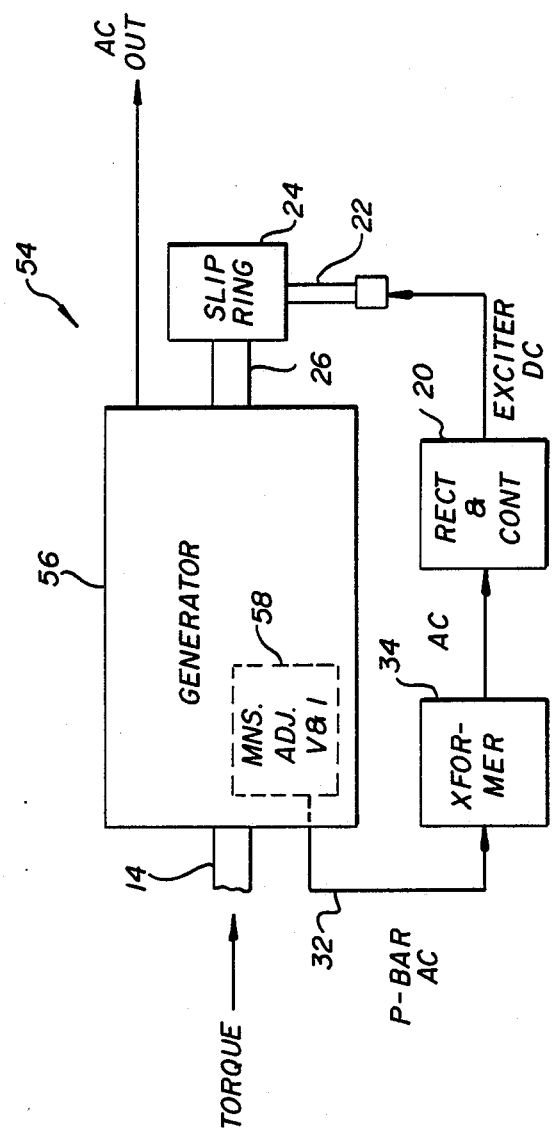
FIG. 4 is a block diagram of a generator and P-bar exciter system according to an embodiment of the invention.

Referring now to FIG. 4, there is shown, generally at 54, a generator and exciter system according to an embodiment of the invention. A generator 56 includes P-bars (not shown) therein for generating exciter power. In addition to the P-bars, generator 56 includes means for adjusting exciter voltage and current 58, to be explained in detail hereinbelow. The exciter ac power from generator 56 is applied through excitation transformer 34 to rectifier and control assembly 20, as in the prior embodiment.

We have discovered that substantial savings can be realized in excitation transformer 34 by adjusting the voltage and current available to it, rather than accepting the voltage and current available directly from the P-bars. In most cases, the voltage should be reduced by means for adjusting exciter voltage and current 58 so that a smaller excitation transformer 34 will suffice. In some cases, it may be desired to increase the voltage applied to excitation transformer 34 over that which would be available from generator 56 without means for adjusting exciter voltage and current 58.

Figure 5:
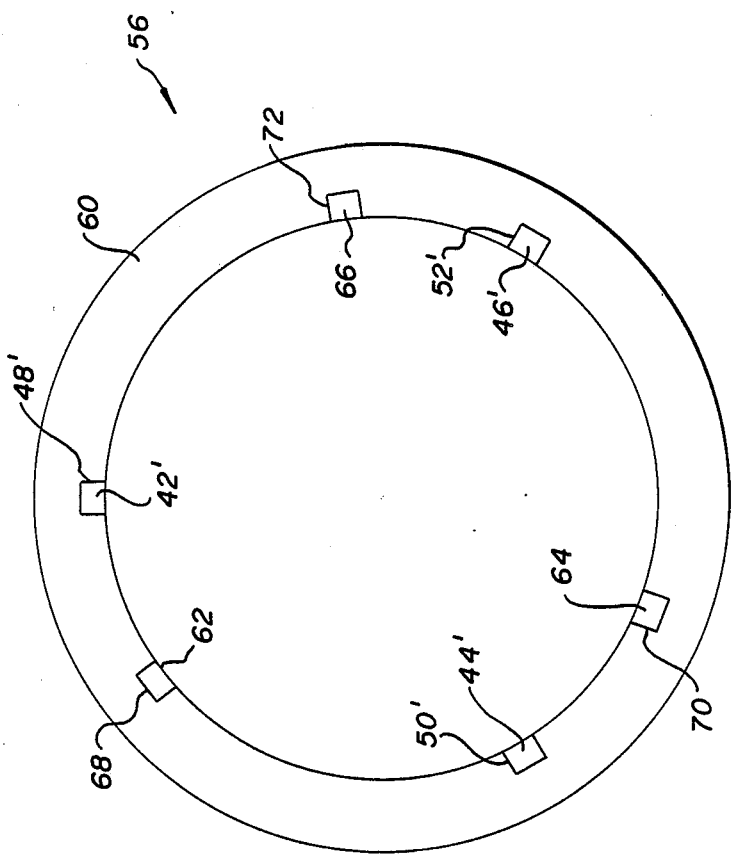
FIG. 5 is a cross section of the armature of the generator of FIG. 4, showing one technique for adjusting the P-bar voltage and current.

Referring now to FIG. 5, generator 56 contains an armature 60 having three P-bars 42', 44' and 46' angularly spaced at 120 degrees apart in selected armature slots 48', 50' and 52', respectively. In addition, a set of three auxiliary P-bars 62, 64 and 66 are spaced angularly at 120 degrees apart in armature slot 68, 70 and 72, respectively. It will be noted that the set of three armature slot 68, 70 and 70 are offset angularly from the set of three P-bars 42', 44' and 46. Accordingly, the voltages and currents induced in corresponding bars of the two sets, although of the same amplitude, differ in phase according to the angular spacing between them.

The arrangement shown can be used either to increase or decrease the voltage fed to excitation transformer 34. If P-bar 42' and auxiliary P-bar 62 are connected in series, the voltages generated therein are summed vectorially. Such a vector sum produces a sinusoidal voltage having a peak value lower than the peak of either voltage alone. The amount by which the vector sum reduces the output voltage depends on the angle between P-bar 42' and auxiliary P-bar 62. The vector sum can be adjusted to any value within the limitation of step adjustment desired by appropriate selection of the angle. Similarly, P-bar 44' may be paired with auxiliary P-bar 64 and P-bar 46' may be paired with 66.

In a similar manner, the exciter voltage may be increased, if desired. If P-bar 42' is connected in series with auxiliary P-bar 64, the vector sum of voltages is greater than that available from either. The angle selected may increase the voltage to as much as twice the individual voltages. Similarly, P-bar 44' can be paired with auxiliary P-bar 66 and P-bar 46' can be paired with auxiliary P-bar 62.

Referring again to FIG. 3, a further technique may be employed for adjusting the voltage available from P-bars 42, 44 and 46. For a given flux, the voltage produced by a P-bar is proportional to the inverse of the number of series turns of armature winding (in addition to the P-bars) in hollow cylindrical structure 38. Within limits, it is feasible to increase or decrease the number of turns of armature winding, thereby decreasing or increasing, respectively, the voltage available from the P-bars.

We have thus disclosed two different techniques for adjusting the exciter voltage, both upward and downward, available from P-bars in a generator.

Figure 6:
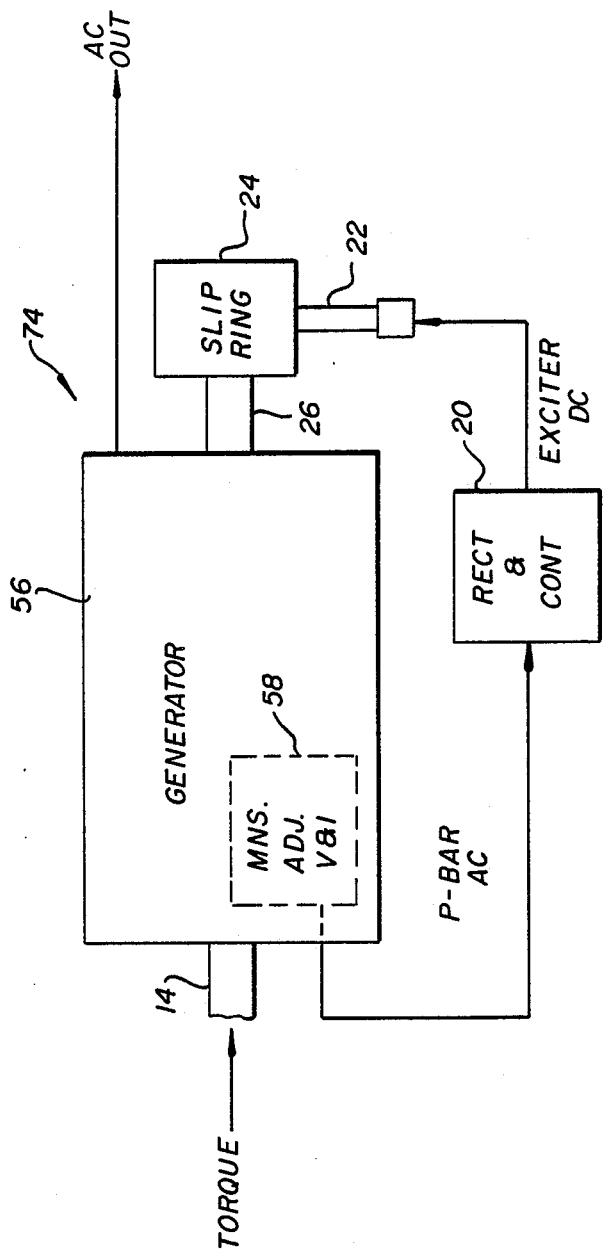
FIG. 6 is a block diagram of a generator and P-bar exciter system according to a further embodiment of the invention.

Referring now to FIG. 6, there is shown, generally at 74, a generator and exciter system according to a further embodiment of the invention. In some installations, we have discovered that the adjustment of voltage and current possible using the techniques discussed above are in the same range required by generator 56. The voltage available directly from the P-bars in large generators, absent means for adjusting exciter voltage and current 58, is about 1200 to about 1800 line to line. This is substantially above the 820-volt capability of conventional bridge rectifiers. When means for adjusting exciter voltage and current 58 is employed, however, it is well within the capability of the apparatus to produce excitation voltages in the vicinity of 820 volts. The reduced voltage, of course, invokes increased current for providing the required excitation power. The cost of rectifiers in rectifier and control assembly 20 depends in part on the amount of current they must carry. Such cost is a step-wise function since, once the current-carrying capacity of the rectifiers must be increased, it is generally increased by a substantial amount. Thus, if adjustment of exciter source voltage can be made in a manner which maintains the exciter current within the capability of conventional rectifiers, then the cost of additional rectifiers need not be borne.

Some generator and exciter systems use rectifier power conversion modules capable of carrying about 2500 amperes. If this value of current is exceeded, the current capacity is increased in increments of 2500 amperes. Each step increase involves a substantial expense for the rectifiers, cabinet and related costs. It appears that some generators in the power range of from about 300 to about 450 MVA may be capable of using the direct output of P-bars without an excitation transformer. In this power range, an exciter voltage of less than about 820 volts and an exciter current of less than about 2500 amperes permits direct use, without requiring an additional increment of rectifier capacity. For larger systems, increased capacity may require an additional increment of rectifier capacity. However, this may be economically attractive due to the tradeoff with the elimination of the excitation transformer, as well as for operational benefits described below.

Direct excitation has several attractive advantages. First, there is the substantial reduction in cost from the elimination of the excitation transformer. In addition, it is found that the substantial inductance of an excitation transformer reduces the per-unit margin of the excitation system. This increases the time required for an excitation system to respond to increased demands of its field rotor. Elimination of the excitation transformer increases the per-unit margin by, for example, a factor of three or more, and thus improves the transient response of the generator and power system.

It may be desirable to limit fault current through the P-bars in case of a short circuit in the system. For this, small and inexpensive air-core inductors may be placed in series with the individual P-bar currents.

The present disclosure omits a number of conventional circuit features such as ground-fault detection and circuit breakers. It is believed that, since such features are conventional, their omission from the present disclosure will not interfere with the ability of one skilled in the art to make and use the invention.

Having described preferred embodiments of the invention with reference to the accompanying drawings, it is to be understood that the invention is not limited to those precis embodiments, and that various changes and modifications may be effected therein by one skilled in the art without departing from the scope or spirit of the invention as defined in the appended claims.

What is claimed is:

1. A generator and excitation system comprising: a generator;
   an armature in said generator;
   a field rotor in said generator;
   said field rotor being rotatable within said armature;

a plurality of slots in said armature for containing armature windings;

at least three of said plurality of slots each containing a P-bar;

means for connecting an electrical power output of said P-bars to said field rotor for excitation thereof;

said means for connecting including means for converting an ac excitation electric power to a dc excitation electric power, whereby said field rotor is magnetized;

means for adjusting a value of at least a voltage of said ac excitation electric power connected to said means for converting; and said means for adjusting being at least partly contained in said armature.

2. A generator and excitation system comprising:
a generator;
an armature in said generator;
a field rotor in said generator;
said field rotor being rotatable within said armature;
a plurality of slots in said armature for containing armature windings;
at least three of said plurality of slots each containing a P-bar;
means for connecting an electrical power output of said P-bars to said field rotor for excitation thereof;
said means for connecting including means for converting an AC excitation electric power to a DC excitation electric power, whereby said field rotor is magnetized;
means for adjusting a value of at least a voltage of said AC excitation electric power connected to said means for converting; and
said means for adjusting is completely contained in said armature.

3. A generator and excitation system according to claim 1 wherein said means for adjusting includes:
a portion internal to said armature; and
a transformer intermediate said armature and said means for converting.

4. A generator and excitation system according to claim 1, comprising:
a generator;
an armature in said generator;
a field rotor in said generator;
said field rotor being rotatable within said armature;
a plurality of slots in said armature for containing armature windings;
at least three of said plurality of slots each containing a P-bar;
means for connecting an electrical power output of said P-bars to said field rotor for excitation thereof;
said means for connecting including means for converting and AC excitation electric power to a DC excitation electric power, whereby said field rotor is magnetized; and
said P-bars forming a three-phase source of AC excitation power;
each phase of said three-phase source including a P-bar and an auxiliary P-bar;
said P-bar and said auxiliary P-bar of each phase being connected for vector addition of power components generated therein; and
said P-bar and said auxiliary P-bar of each phase being angularly spaced apart within said armature to adjust at least said voltage of said phase.

5. A generator and excitation system according to claim 4, wherein an angular spacing between said P-bar and said auxiliary P-bar of each phase is disposed at an angle causing a reduction in a voltage of said phase.

6. A generator and excitation system according to claim 4, wherein an angular spacing between said P-bar and said auxiliary P-bar of each phase is disposed at an angle causing an increase in a voltage of said phase.

7. A generator and excitation system according to claim 1, wherein said means for adjusting includes a number of armature turns in said armature winding effective for adjusting said at least a voltage generated by said P-bars.

* * * * *